United States Patent [19]

Muranaka et al.

[11] 4,337,640
[45] Jul. 6, 1982

[54] KNOCKING SENSOR

[75] Inventors: Shigeo Muranaka; Michio Onoda, both of Yokohama; Kunihiko Sugihara, Takasho, all of Japan

[73] Assignee: Nissan Motor Co., Ltd., Yokohama, Japan

[21] Appl. No.: 138,572

[22] Filed: Apr. 8, 1980

[30] Foreign Application Priority Data

Apr. 10, 1979 [JP] Japan .................................. 54-43485
Apr. 10, 1979 [JP] Japan ............................. 54-47352[U]

[51] Int. Cl.³ ............................................. G01L 23/22
[52] U.S. Cl. .......................................... 73/35; 73/660
[58] Field of Search .................... 73/35, 654, 660, 717, 73/721; 310/322, 324, 321; 181/160, 172

[56] References Cited

U.S. PATENT DOCUMENTS

| 1,715,831 | 6/1929 | Hahnemann | 181/160 |
|---|---|---|---|
| 1,907,415 | 5/1933 | Carpenter et al. | 73/35 X |
| 2,340,714 | 2/1944 | Traver et al. | 73/35 |
| 3,069,672 | 12/1962 | Rau | 73/593 |
| 4,190,782 | 2/1980 | Guess | 310/324 |
| 4,220,831 | 9/1980 | Zink | 181/160 |
| 4,228,379 | 10/1980 | Guscott et al. | 310/322 |

FOREIGN PATENT DOCUMENTS 1350023 4/1972 United Kingdom .

*Primary Examiner*—James J. Gill
*Attorney, Agent, or Firm*—Schwartz, Jeffery, Schwaab, Mack, Blumenthal & Koch

[57] ABSTRACT

A knocking sensor having a thin vibrating plate (10) receiving sound produced from an engine. The vibrating plate is applied with a piezoelectric element (11) which delivers electric output in proportion to the vibration. The resonance frequency of the vibrating plate is made same as the knocking frequency. A resonant tube (20) for forming resonating cavity is attached in front of the vibrating plate. A sound collector (30) is provided in front of the vibrating plate. A duct (50) is arranged between the sound collector and the sensor to improve sensitivity and freedom of mounting of the sensor.

2 Claims, 6 Drawing Figures

KNOCKING SENSOR

BACKGROUND OF THE INVENTION

The present invention relates to a knocking sensor for detecting the knocking generated in an internal combustion engine.

It has been known generally that the engine output and the fuel consumption characteristics become optimum under light knocking condition at relatively low speed engine rotation range while a strong continuous knocking affects seriously the durability of the engine. Accordingly, it has been the usual practice to take into account the ignition timing, which is closely related to the knocking, and a device in which the ignition timing is advanced or retarded by detecting the knocking condition of the engine so as to maintain a light knocking condition and to improve the fuel consumption and the output characteristics had been proposed.

In such a type of device, a knocking sensor for detecting the knocking in the engine is indispensable and various knocking sensors are known heretofore. Among such various known knocking sensors, there is one to detect the knocking condition by the knocking sound irradiated from the engine at the occurrence of the knocking condition.

This knocking sensor usually uses a condenser microphone. An example of such a sensor is shown in FIG. 1, which comprises a vibrating film 2 secured the peripheral portion by a microphone body 1 and a rear plate 3 arranged in proximity at back of the vibrating film 2. The rear plate 3 is mounted onto the microphone body 1 via an insulating material 4. In this knocking sensor, the vibrating film vibrates by a produced sound of an engine and electrostatic capacity between the vibrating film 2 and the rear plate 3 varies. This varying signal is derived as an output to an ignition timing controlling device not shown in the drawing and the knocking is judged.

In such a known knocking sensor, since a very small variation of the electrostatic capacity is to be sensed, the thickness of the vibrating film 2 and the space between the film 2 and the rear plate 3 are made some tens of microns respectively. Due to such a very delicate construction, the output characteristics vary greatly by the variation of environmental condition such as the temperature, moisture, etc. Furthermore by the very delicate construction of the thin vibrating film 2 and the narrow gap between the film 2 and the rear plate 3, a fine working is required and inconvenience is unavoidable in the increase of cost of the products.

Further disadvantage of the conventional knocking sensor lies in that the manner of mounting of the knocking sound sensor on the body structure of the vehicle. It was usual practice to mount the knocking sound sensor directly on such a body structure, therefore the conventional knocking sound sensor is generally located at some distant position from the engine body in an engine room. The knocking sound sensor is influenced by the temperature in the engine room which varies over a wide range depending on the outer temperature and the driving condition and the detecting characteristics varies accordingly. Furthermore, sound other than the knocking sound, for instance, noise coming from the regulating valve system and the auxiliary equipments, and outer noise may be picked up and thus the detecting characteristic varies and the detecting sensitivity may become unstable and lowered.

SUMMARY OF THE INVENTION

The present invention has for its object to mitigate the aforementioned inconvenience of the conventional knocking sensors. According to the present invention a knocking sensor is realized by arranging a sound receiving part by a vibrating plate fixed with a thin plate like piezo-electric element and the resonance frequency of the vibrating plate is made the same with the frequency of the knocking sound produced by the engine so as to definitely detect the knocking of an engine and to ease the working of the parts to reduce the cost of the products.

Further improvement of the present invention lies in that a sound collecting portion is arranged adjacent the engine body, the knocking sound detector is mounted at a location distant from the engine body, and a duct is arranged between the sound collecting portion and the knocking sound detector portion so that entrance of outer noise to the knocking sound detector is prevented and at the same time the influence of thermal variation is avoided. By this construction the knocking detection sensitivity is improved and also is made very stable.

DESCRIPTION OF THE PREFERRED EMBODIMENT

The invention will now be explained by referring to the accompanying drawings.

Figure 1:
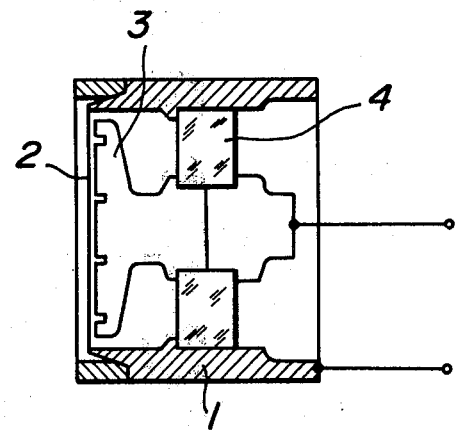
FIG. 1 is a vertical cross-sectional view showing a conventional knocking sensor, which has just been explained in the foregoing.
Figure 2:
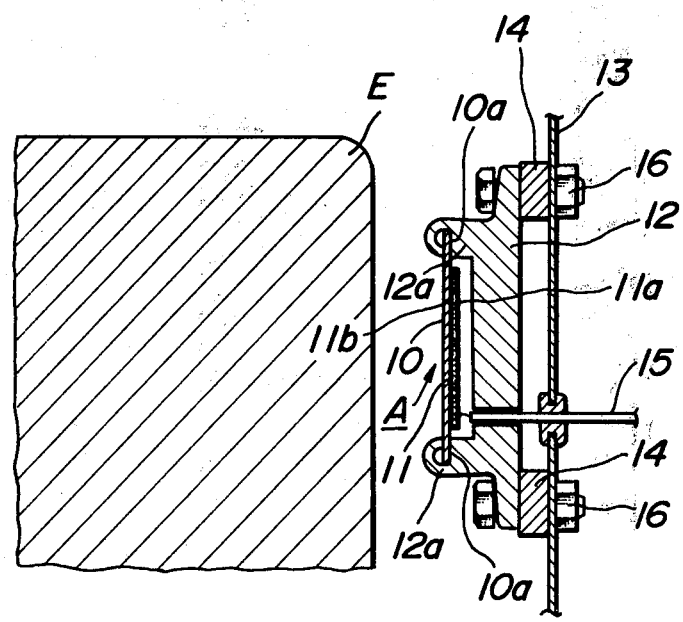
FIG. 2 is a vertical cross-sectional view showing a knocking sensor according to the present invention.

A knocking sensor according to the present invention is shown in FIG. 2. The knocking sensor comprises a circular form metal vibrating plate 10 affixed with a thin plate shaped piezoelectric element 11 made for instance of PZT (zircon titanate). Periphery 10a of said vibrating plate 10 is secured in a ring shaped flange portion 12a of a metal case 12 and the vibrating plate is fixed. On both surfaces of the piezoelectric element 11 electrodes 11a and 11b are formed for instance by silver coating. Electrode on one side of the element is electrically connected to the metal vibrating plate 10 by means of conductive adhesive or the like. A resonant frequency of the vibrating plate, which is decided by the thickness, the material and the supported diameter, is selected to be substantially the same with the frequency of the main knocking sound produced from the engine E. This value is generally 5–9 KHz but differs greatly depending on the kind of the engine. Said metal case 12 is mounted on the body panel 13 at a location having some distance from the engine body through a cushion material 14 and in a manner that the vibration of the engine body E will not effect directly. Further for obtaining a good sensitivity of the vibrating plate 10 for the knocking sound, the vibrating plate 10 is arranged just in opposite to the engine body E.

In the above arrangement, if the knocking is caused during the operation of the engine, the knocking sound is conveyed to the vibrating plate 10 so that the piezoelectric element 11 vibrates and deforms and a voltage having frequency corresponding to the vibration is produced. This voltage is derived out through a lead wire 15 connected to the electrode 11a of the piezoelectric element and an earthed body surface of the body panel 13 or the like electrically conducting through a mounting bolt 16 for mounting the case portion 12 to the other electrode.

In the present embodiment since the resonance frequency of the vibrating plate 10 is made to be nearly the same as the frequency of the knocking sound of the engine, the vibrating plate vibrates greatly at the time of occurrence of the knocking so that the knocking condition can be detected very definitely.

Figure 3:
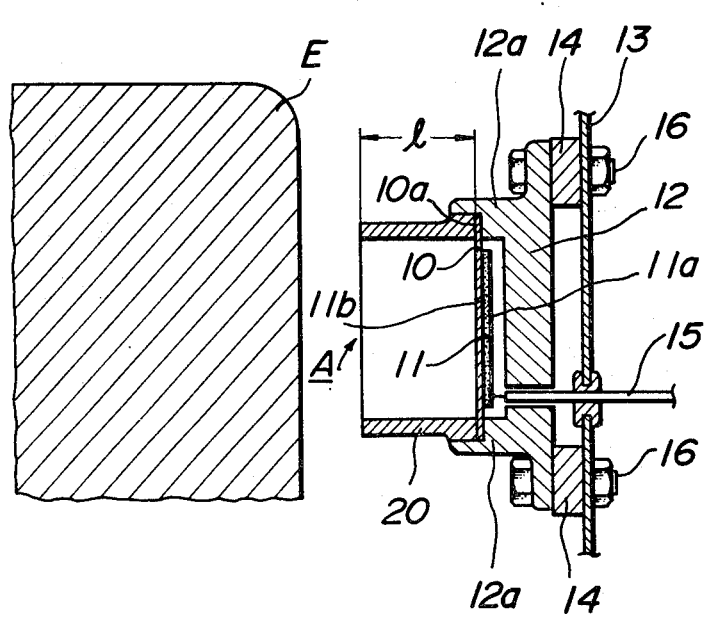
FIG. 3 and FIG. 4 are modified embodiments of the knocking sensor of the present invention.

The embodiment shown in FIG. 3 has a resonant tube 20 for resonating the knocking sound produced in the engine. This resonant tube 20 is mounted on the case portion 12 and adjoining with the peripheral portion 10a of the vibrating plate 10. The inner diameter of the resonant tube 20 is made same with the flange portion 12a of the case body 12. If we assume the length of the resonant tube 20 as l and the wavelength of the knocking sound $\lambda$, the length l of the resonant tube 20 is to satisy the followings:

$$l = m/2\lambda (m \ldots \text{integer})$$

By mounting the resonant tube 20 as shown above, the sensitivity in the knocking frequency range can be improved and the succeeding signal treatment may become easy by the increase of the S/N ratio.

Figure 4:
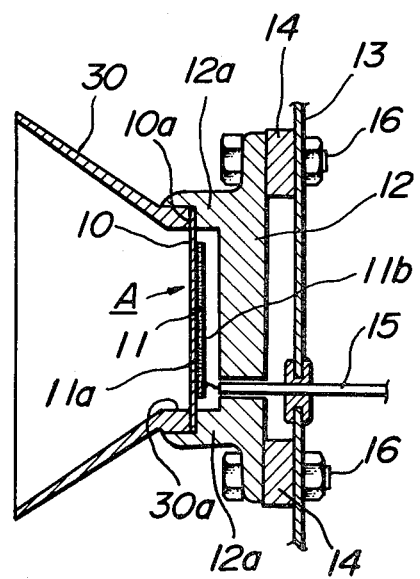

Another embodiment shown in FIG. 4 is provided with a cone formed sound collector 30 in front of the knocking sound inlet A to the vibrating plate 10. Inner diameter of the small diameter portion 30a of the collector 30 is made substantially same as the inner diameter of the flange portion 12a. End surface of the small diameter portion 30a is abutted with the vibrating plate 10 and the collector 30 is secured on the case body 12. Although not illustrated in the drawing it is possible to mount such sound collector 30 over the reasonating tube 20 shown in FIG. 3. In this case the smaller diameter portion 30a is to be mounted on the top of the resonating tube 20.

By providing the knocking sound collector 30 at the knocking sound inlet A, the knocking sound produced from an engine (not shown in FIG. 4) can be collected efficiently and the sensitivity of the vibrating plate 10 can be increased. In general, the vibrating plate 10 is oppositely arranged against the engine body where the knocking sound is produced strongly, i.e. the cylinder portion. Possible decrease in the sensitivity due to relative positional shift between the cylinder portion and the vibrating plate 10 may be compensated by the provision of the sound collector 30.

Figure 5:
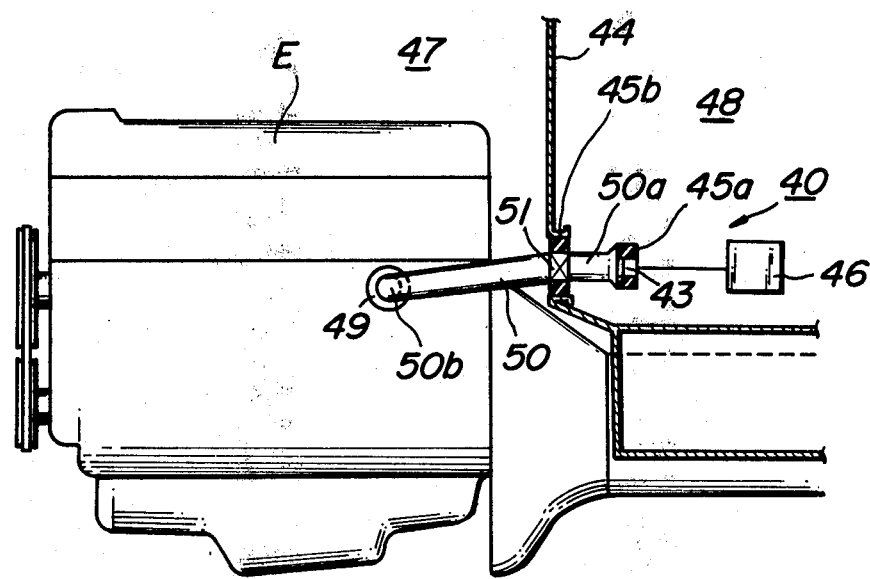
FIG. 5 and FIG. 6 are schematic side view and plan view for showing manner of mount of the knocking sensor of the present invention.
Figure 6:
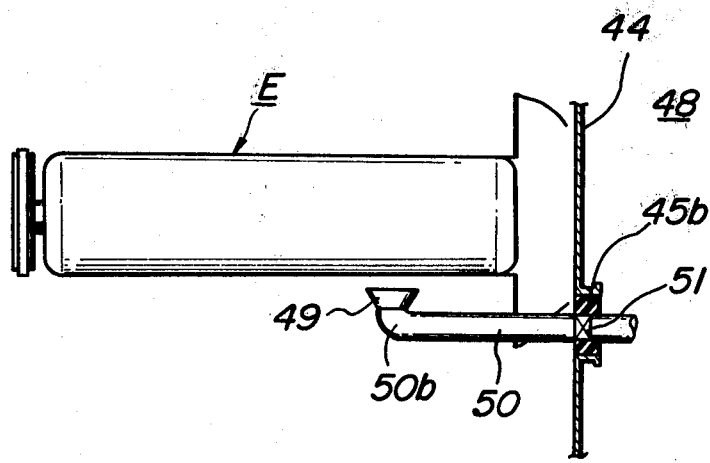

Further embodiment of the present invention in which the knocking sensor or detector can be mounted at a location more distant from the engine is shown in FIGS. 5 and 6. In these figures E represents the engine body and 40 designates the knocking detecting device. The knocking detecting device 40 comprises a knocking sound sensor 43 arranged on a body structure 44 in a cabin 48, for instance, on the dashpanel being separated from the engine room 47.

Whereas a cone shaped sound collector portion 49 is arranged near the engine body E. Between the sound collector 49 and the knocking sound sensor 43, a duct 50 is extended.

The knocking sound sensor 43 is mounted on one end surface 50a of the duct 50 by an elastic material 45a. In FIG. 5, 46 represents an amplifier.

This sound collector portion 49 is arranged opposite to the engine body especially at the proximity of the cylinders and fixed on one end of the duct 50. The duct 50 is arranged to pass through the body structure. At the location of passing through the body the duct 50 is supported by the body via an intervention of elastic material. It is also possible to cut the duct at such penetrations and to interpose a filter, like sponges, which passes the sound but insulate the heated air in the engine room to come into the cabin.

By this construction, the knocking sound produced in the engine body 1 is collected by the collector 49 arranged proximity thereof for obtaining high sensitivity and then passed through the duct 50 and detected by the sensor 43 and an electric output is obtained.

By using the sound collector 49 and the duct 50 mixing of valve noise and outer noise can be prevented and the S/N ratio and sensitivity may be improved. The detector 43 is mounted in the cabin by using the duct, the influence of the engine temperature and outer temperature can be decreased and a stable characteristics may be obtained.

A plurality of collectors may be arranged at various portions of the engine and by using a manifold duct to couple to a single knocking sensor to further improve the sensitivity.

As has been mentioned in the foregoing in the knocking sensor according to the present invention, the periphery of the vibrating plate fixed with the piezoelectric element is protected by a case portion with flange and the case portion is mounted at a location in a certain distance from the engine by a cushion material and the vibrating plate is used as the sound receiver to detect the produced sound from the engine and the vibration is detected by the piezoelectric element as the frequency output and by arranging the resonant frequency of the vibrating plate to be the same with the knocking frequency of the engine the knocking can steadly be detected.

Since the resonant frequency of the vibrating plate can be modified easily, for instance by varying the diameter, the sensor may be applied for various kinds of internal combustion engine.

The construction is very simple and merely protect the periphery of the vibrating plate by the case portion the manufacture is easy at cheap cost.

By application of the resonating cavity the accuracy can be improved. Further by the provision of the sound collecting cone the sensitivity of the sensor can be increased. Furthermore, by a combined use of duct, the sensor can be mounted at a convenient location for instance in the cabin to make further arrangement for instance connection of the amplifier and meter very easy.

The vibrating plate is well protected against the environmental condition like the moisture so that a stable resonance frequency band is obtained and a steady knocking detection is possible.

What is claimed is:

1. A knocking sensor for detecting knocking at a given frequency in an internal combustion engine, said engine mounted in a vehicle having a body structure defining a cabin, said sensor comprising:

a thin plate, said plate having a resonant vibration frequency equal to said given frequency;

case means for peripherally mounting said thin plate, said case means being located apart from said engine and being mounted in said cabin;

a piezoelectric element mounted on said plate for providing an electrical signal indicative of any vibration of said plate;

means for defining a resonant cavity which is resonant at said given frequency, said means including said thin plate;

means for sound collection located adjacent said engine; and means for defining a duct acoustically coupling said sound collection means and said resonant cavity defining means.

2. The knocking sensor according to claim 1, wherein said duct passes through said body structure, said duct further includes means for preventing the flow of air through said duct and for permitting the passage of sound therethrough.

* * * * *